United States Patent [19]

Guimbretie e

[11] Patent Number: 4,836,051
[45] Date of Patent: Jun. 6, 1989

[54] DIFFERENTIAL TRANSMISSION DEVICE IN PARTICULAR FOR A MOTOR VEHICLE

[75] Inventor: Pierre L. Guimbretie e, Neauphle-le-Chateau, France

[73] Assignee: Glaenzer-Spicer, Poissy, France

[21] Appl. No.: 98,057

[22] Filed: Sep. 17, 1987

[30] Foreign Application Priority Data

Sep. 19, 1986 [FR] France .................. 86 13187

[51] Int. Cl.[4] .......................... F16H 1/44
[52] U.S. Cl. .................................. 74/711
[58] Field of Search .................. 74/710.5, 711

[56] References Cited

U.S. PATENT DOCUMENTS

| 3,590,954 | 7/1971 | Plantan | 74/710 X |
| 4,601,359 | 7/1986 | Weismann et al. | 180/233 |
| 4,703,671 | 11/1987 | Jikihara | 74/710.5 |

FOREIGN PATENT DOCUMENTS

| 600138 | 6/1960 | Canada | 74/710.5 |
| 0132238 | 1/1985 | European Pat. Off. | |
| 0175674 | 3/1986 | European Pat. Off. | |
| 1451697 | 10/1965 | France | |
| 60-237242 | 11/1985 | Japan | 74/710.5 |
| 281096 | 9/1970 | U.S.S.R. | 74/710.5 |
| 834583 | 5/1960 | United Kingdom | |
| 2038429 | 7/1980 | United Kingdom | |

*Primary Examiner*—Dwight G. Diehl
*Attorney, Agent, or Firm*—Wenderoth, Lind & Ponack

[57] ABSTRACT

The object of this device is to simplify and reduce the cost of the original assembly and/or the optional mounting of a controlling or limiting device associated with a differential mechanism whose output elements are connected to coaxial wheel shafts. This result is obtained by providing interengaging splines (16, 26) provided on two of the input and output elements of the differential, these splines being accessible from the exterior of the frame (2) and of the rolling bearings (3, 4) which support the differential and permitting the easy mounting of a limiting device (20) of any suitable type, for example of the slip type.

17 Claims, 2 Drawing Sheets

DIFFERENTIAL TRANSMISSION DEVICE IN PARTICULAR FOR A MOTOR VEHICLE

BACKGROUND OF THE INVENTION

1. Field of the Invention

The present invention relates to transmission devices intended to be used in particular on motor vehicles.

More precisely, this invention concerns a device comprising a differential associated with a control device and/or a device for limiting the differential rotation between the two output shafts of the differential. This limiting device is interposed either between the two output elements of the differential or between one of these output elements and the input element.

2. Description of the Prior Art

In the various known arrangements, irrespective of the type of the limiting or controlling device, the latter is incorporated in the differential mechanism and is located between the bearings or rolling bearings which support and stabilize the whole of the differential. This arrangement requires the manufacture of different component parts depending on whether the transmission is equipped or not with a controlling or limiting device and also results in a modification of the environment of the differential depending again on whether the transmission includes or not this controlling or limiting device. This results in a relatively high cost both for the equipment of new vehicles comprising this option and for the conversion of existing vehicles.

SUMMARY OF THE INVENTION

The object of the invention is to propose an arrangement which permits overcoming these various drawbacks and to be able to equip a transmission with a controlling or limiting device in a particularly economical manner which takes up a small amount of space.

For this purpose, the invention provides a transmission device comprising a differential mechanism provided with an input element and two output elements rotatively mounted in a fixed frame about a common axis, by means of two bearings or rolling bearings disposed on each side of this differential mechanism. The two output elements are connected respectively to two coaxial wheel shafts and at least two of said input and output elements include means for connecting them to a device for controlling and/or limiting the differential rotation between the two output elements of the differential device, said connecting means being accessible from the exterior of said frame and said bearings or rolling bearings.

According to other features of the invention:

the connecting means are disposed outside a zone defined by the frame and the bearings;

the input element of the differential has a lateral extension constituted by a hollow shaft section in which extends one of the output elements, said lateral extension extending beyond the associated bearing or rolling bearing and including said connecting means;

the output elements are shafts and that one of said shafts which extends in the hollow shaft section includes the connecting means in the vicinity of the end of said hollow shaft section;

the connecting means comprises splines;

the two shafts are connected to homokinetic joints, one of which is located in the vicinity of the associated bearing or rolling bearing whereas the other is remote from said bearing, the connecting means being located adjacent to the longest shaft and the longest shaft being supported by an intermediate support bearing located between the place of the controlling or limiting device and the associated homokinetic joint.

BRIEF DESCRIPTION OF THE DRAWINGS

The invention will be described in more detail hereinunder with reference to the accompanying drawings which are given solely by way of example and in which.

DETAILED DESCRIPTION OF THE PREFERRED EMBODIMENTS

Figure 1:
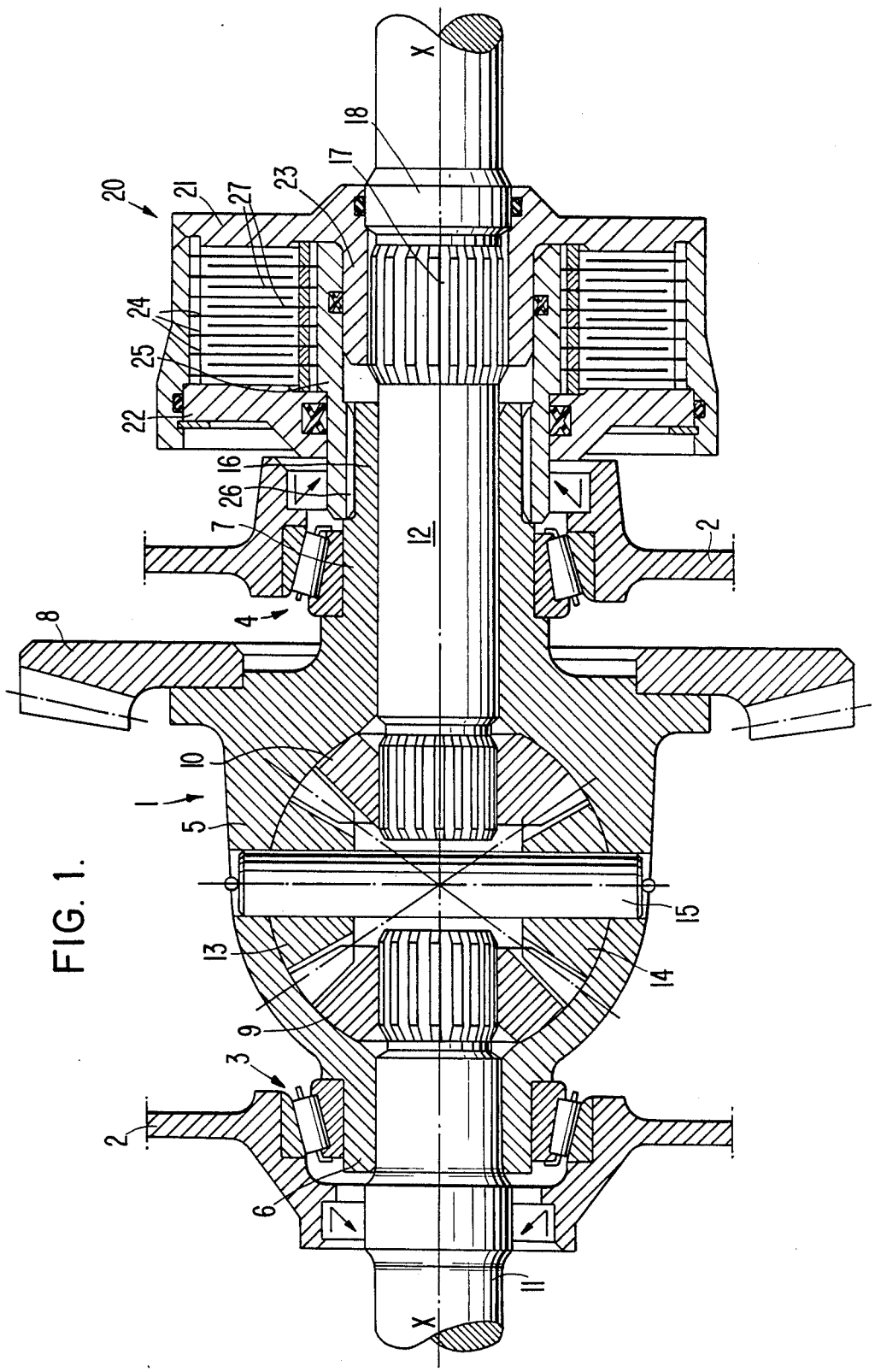
FIG. 1 is a longitudinal sectional view of a first embodiment of a device according to the invention.

FIG. 1 shows a placement diagram relative to a vehicle having a rigid rear axle. In FIG. 1, the whole of the differential 1 is supported in a frame or case 2 by two rolling bearings 3 and 4 having an axis X—X.

The differential comprises in the known manner a housing 5 having two lateral extensions 6, 7 by which it is rotatively mounted in the bearings 3 and 4.

The differential further comprises a ring gear 8 rigid with the housing 5 and two sun gears 9, 10 which are coaxial and centered on the same axis XX as the ring gear and the bearings 3 and 4, said two sun gears being rigid with output elements of the differential comprising transmission shafts 11, 12 which extend through the housing and in the direction of the driving wheels of the vehicle. Planet gears 13, 14 engaged with the sun gears are rotatively mounted on a planet gear carrier 15 carried by the housing.

According to the invention, the hollow shaft section 7, which constitutes a lateral extension of the housing of the differential, extends beyond the rolling bearing 4 and has a splined end portion 16. Likewise, the transmission shaft 12 which extends through this hollow shaft has in a region 17 located in the vicinity of the end of this hollow shaft an externally splined portion and a bearing portion 18.

These two splined portions 16, 17 are adapted to permit the mounting of a device 20 for limiting or controlling the sliding which is constituted in the illustrated embodiment, by a limited slip coupling of the type sold under the trademark Viscodrive. This device comprises a first element 21 constituting a housing closed by a plate 22 and including a cylindrical axial portion 23 provided with internal splines cooperative with the external splines of the shaft 12. This first element is connected to rotate with a first series of discs 24.

The device 20 further comprises a second element or hub 25 constituted by a stepped cylindrical sleeve and including in a first region internal splines 26 cooperative with the external splines 16 of the hollow shaft section rigid 7 which is with the housing of the differential. In a second region, this second element is connected to rotate with a second series of discs 27 arranged in an alternating manner with the discs 24. In the volume defined by the housing 21 and located between the series of discs 24, 27 is located a viscous fluid such as a silicone oil.

Figure 2:
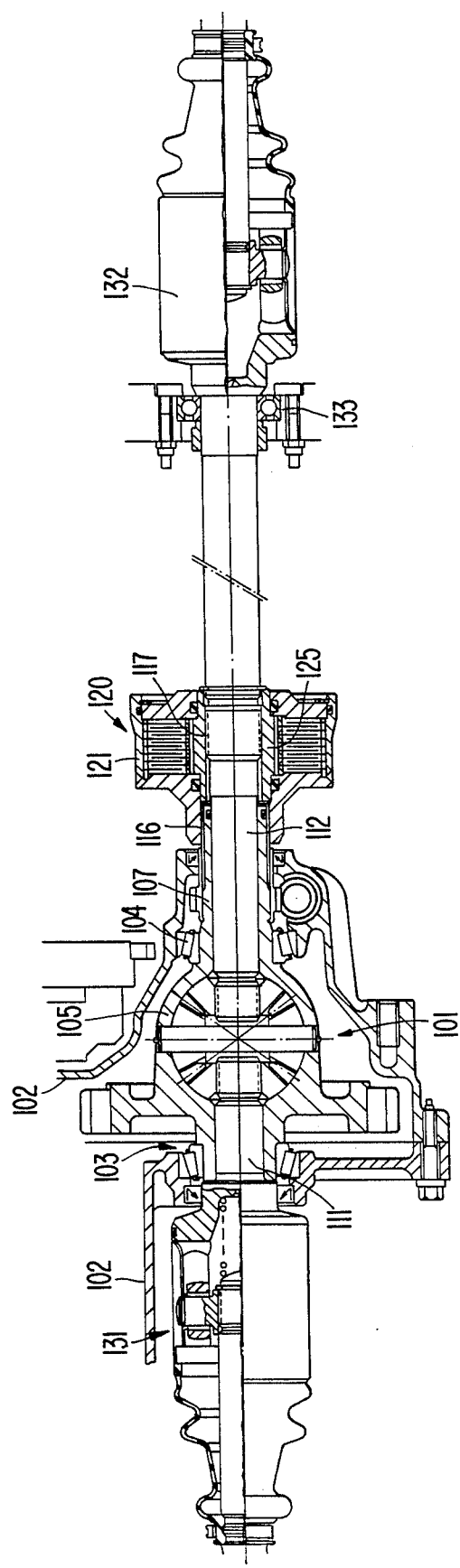
FIG. 2 is a view partly in longitudinal section and partly in elevation of another embodiment of said device.

A similar arrangement is represented in FIG. 2 but applied to a front wheel drive assembly for a front wheel drive vehicle. The engine and a part of the transmission (clutch and a gear box) which are disposed in a transverse position relative to the vehicle, are not shown in the drawing. In FIG. 2, the elements corresponding to those of FIG. 1 are designated by the same reference numerals to which 100 has been added. As is relatively common, the differential 101 is offset or out of center due to lack of space in particular in the region of the clutch housing. Consequently, the transmission shafts which connect the sun gears of the differential to the driving wheels have unequal lengths. Each of the output shafts 111, 112 is connected to a homokinetic joint 131, 132, preferably of the tripod type, and the joint 132 associated with the shaft 112 is disposed at the end of this shaft outside a supporting or thrust bearing 133.

As in the preceding embodiment, the differential disposed in a frame 102 is supported by two rolling bearings 103, 104, the housing 105 is extended beyond this rolling bearing 104 on the side where it has the longest transmission shaft extending therethrough and this extension 107 of the housing and the adjacent transmission shaft 112 include splines 116, 117 or other like coupling means permitting the mounting of a controlling or limiting device 120, for example of the type sold under the trademark Viscodrive. In this variant, it is the hub 125 of the device 120 which may be rendered rigid with the shaft 112 while the housing 121 is coupled to the extension 107.

In the two placement arrangements described, the invention affords the following advantages :

the fact of providing one of the output shafts and an extension of the differential housing with coupling means such as splines does not markedly complicate the manufacture and substantially does not increase the cost of the transmission ;

the fact that these coupling means are accessible from the exterior of the frame and the bearings supporting the differential permits the mounting as an option of a limiting or controlling device which substantially improves the operation of the differential ;

due to this arrangement, the differential and its immediate environment are unchanged whether the vehicle be equipped or not with such a controlling or limiting device ;

the controlling or limiting device is easily accessible, which constitutes an essential advantage in the case of an additional mounting, repairs or disassembling. This facility of access even permits an easy adaptation of the features of this device to the conditions of utilization of the vehicle ;

the controlling or limiting device in the position it occupies according to the invention is located between the housing of the differential and one of its output elements in parallel with the conventional path of the transmission of the torque, which permits the elimination of the unavoidable mechanical play which exists at least in the three successive connections between the planet gear carrier and planet gears, the planet gears and sun gears and the sun gear and the output shaft.

The assembly is particularly compact since the connecting means and, as the case may be, the controlling or limiting device are disposed coaxially with the differential and the wheel shafts.

It will be understood that there may be used in the described arrangement any suitable type of controlling or limiting device having an automatic operation or a controlled and piloted operation.

Further, the differential mechanism may be of any type. It is also possible to provide means according to the invention on each side of the differential.

While the invention has been described with reference to the foregoing embodiments, various changes and modifications may be made thereto which fall within the scope of the appended claims.

What is claimed is :

1. A transmission device comprising:

a differential mechanism including a fixed frame, an input element and two output elements, said input element including an elongated hollow shaft section on one side thereof, one of said output elements extending in said hollow shaft section and said two output elements comprising shafts adapted to be connected to driving wheels of a vehicle;

two bearings rotatably supporting said input element and said output elements in said fixed frame for rotation about an axially extending rotation axis, said differential mechanism being axially located between said bearings;

a limiting device for controlling and/or limiting differential rotation between said output elements, said limiting device including two parts rotatable relative to each other and coupled together by alternating discs enclosed within a housing containing viscous fluid and located exteriorily of said fixed frame; and connecting means for coupling at least two of said input element and said output elements with said two parts of said limiting device, said connecting means being axially located exteriorily of said fixed frame and with one of said bearings being axially located between said connecting means and said input element, said connecting means comprising splines on said hollow shaft section engaging with corresponding splines on one of said parts of said limiting device and splines on said one of said output elements extending in said hollow shaft section engaging with corresponding splines on the other one of said parts of said limiting device.

2. The device of claim 1, wherein a first one of said two parts of said limiting device comprises a radially outermost part of said housing with some of said alternating discs extending radially inwardly thereof and a second one of said two parts comprises a radially innermost part of said housing with the remainder of said alternating discs extending radially outwardly thereof.

3. The device of claim 2, wherein said first part of said limiting device is connected by said connecting means to said one of said output elements and said second part of said limiting device is connected by said connecting means to said hollow shaft section.

4. The device of claim 2, wherein said second part of said limiting device is connected by said connecting means to said one of said output elements and said first part of said limiting device is connected by said connecting means to said hollow shaft section.

5. The device of claim 1, wherein said splines on said hollow shaft section are located adjacent a free end thereof.

6. The device of claim 1, wherein said limiting device is supported only by said hollow shaft section and said one of said output elements.

7. The device of claim 1, wherein said limiting device is coaxially mounted about said one of said output elements.

8. The device of claim 1, wherein said limiting device is unenclosed so as to be freely accessible from the exterior thereof.

9. The device of claim 1, wherein one of said shafts comprising said output elements is longer than the other one of said shafts and said limiting device is coaxially mounted on said longer shaft.

10. A transmission device comprising:
a differential mechanism including a fixed frame, an input element and two output elements, said input element including an elongated hollow shaft section on one side thereof, one of said output elements extending in said hollow shaft section and said two output elements comprising shafts adapted to be connected to driving wheels of a vehicle;
two bearings rotatably supporting said input element and said output elements in said fixed frame for rotation about an axially extending rotation axis, said differential mechanism being axially located between said bearings;
a limiting device for controlling and/or limiting differential rotation between said output elements, said limiting device including two parts rotatable relative to each other and coupled together by alternating discs enclosed within a housing containing viscous fluid and located exteriorily of said fixed frame;
connecting means for coupling at least two of said input element and said output elements with said two parts of said limiting device, said connecting means being axially located exteriorily of said fixed frame and with one of said bearings being axially located between said connecting means and said input element, said connecting means comprising splines on said hollow shaft section engaging with corresponding splines on one of said parts of said limiting device and splines on said one of said output elements extending in said hollow shaft section engaging with corresponding splines on the other one of said parts of said limiting device;
homokinetic joints respectively connected to said two shafts, one of said joints being located adjacent one of said bearings and the other one of said joints being remote from the other one of said bearings, one of said shafts being longer than the other one of said shafts, said longer shaft comprising said one of said output elements in said hollow shaft section; and
an intermediate support bearing axially located between said limiting device and said other one of said joints, said intermediate support bearing supporting said longer shaft.

11. The device of claim 10, wherein a first one of said two parts of said limiting device comprises a radially outermost part of said housing with some of said alternating discs extending radially inwardly thereof and a second one of said two parts comprises a radially innermost part of said housing with the remainder of said alternating discs extending radially outwardly thereof.

12. The device of claim 11, wherein said first part of said limiting device is connected by said connecting means to said longer shaft and said second part of said limiting device is connected by said connecting means to said hollow shaft section.

13. The device of claim 11, wherein said second part of said limiting device is connected by said connecting means to said longer shaft and said first part of said limiting device is connected by said connecting means to said hollow shaft section.

14. The device of claim 10, wherein said splines on said hollow shaft section are located adjacent a free end thereof.

15. The device of claim 10, wherein said limiting device is supported only by said hollow shaft section and said longer shaft.

16. The device of claim 10, wherein said limiting device is coaxially mounted about said longer shaft.

17. The device of claim 10, wherein said limiting device is unenclosed so as to be freely accessible from the exterior thereof.

* * * * *